United States Patent
Birkestrand et al.

(10) Patent No.: US 9,600,331 B1
(45) Date of Patent: Mar. 21, 2017

(54) VIRTUAL MACHINE PLACEMENT IN A CLOUD COMPUTING ENVIRONMENT BASED ON FACTORS INCLUDING OPTIMIZED PROCESSOR-MEMORY AFFINITY

(71) Applicant: International Business Machines Corporation, Armonk, NY (US)

(72) Inventors: Daniel C. Birkestrand, Rochester, MN (US); Peter J. Heyrman, Rochester, MN (US); Edward C. Prosser, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/833,421

(22) Filed: Aug. 24, 2015

(51) Int. Cl.
    *G06F 9/455* (2006.01)
    *G06F 9/48* (2006.01)
    *H04L 29/08* (2006.01)

(52) U.S. Cl.
    CPC ........ *G06F 9/4856* (2013.01); *G06F 9/45558* (2013.01); *H04L 67/10* (2013.01); *G06F 2009/4557* (2013.01)

(58) Field of Classification Search
    None
    See application file for complete search history.

(56) References Cited

U.S. PATENT DOCUMENTS

| | | | |
|---|---|---|---|
| 7,577,813 B2 | 8/2009 | Nijhawan et al. | |
| 2013/0346973 A1* | 12/2013 | Oda | G06F 9/5088 718/1 |
| 2016/0147549 A1* | 5/2016 | Sivak | G06F 9/45558 718/1 |

OTHER PUBLICATIONS

IBM powerVM virtualization managing and monitoring Jun. 2013.*
Pachorkar et al., "Multi-dimensional Affinity Aware VM Placement Algorithm in Cloud Computing", International Journal of Advanced Computer Research, vol. 3, No. 4, Issue 13, pp. 121-125, Dec. 2013.
Sudevalayam et al., "Affinity-aware Modeling of CPU Usage for Provisioning Virtualized Application", 2011 IEEE Int'l Conf. on Cloud Computing, Apr. 21, 2011.
Birkestrand et al., "Optimization of Computer System Logical Partition Migrations in a Multiple Computer System Environment", U.S. Appl. No. 14/600,364, filed Jan. 20, 2015.
Birkestrand et al., "Virtual Machine Placement in a Cloud Computing Environment Based on Factors Including Optimized Processor-Memory Affinity" U.S. Appl. No. 14/839,967, filed Aug. 29, 2015.
List of IBM Patents or Patent Applications Treated As Related.

* cited by examiner

*Primary Examiner* — Sisley Kim
(74) *Attorney, Agent, or Firm* — Martin & Associates, LLC; Bret J. Petersen

(57) ABSTRACT

Optimized placement of virtual machines in a cloud environment is based on factors that include processor-memory affinity. A smart migration mechanism (SMM) predicts an optimization score for multiple permutations of placing virtual machines on a target system to create an optimal move list. The optimization score is a theoretical score calculated using dynamic platform optimization (DPO). The SMM may allow the user to set initial parameters and change the parameters to create potential changes lists. The move lists are ranked to allow the user to select the optimal change list to provide the best affinity, quickest fulfillment of requirements and least disruption for a given set of parameters.

11 Claims, 11 Drawing Sheets

Server1 710
| 16 Total Processors, 8 Available |
| 32 GB Memory, 16 GB Available |
| Affinity Score (90/100) |

Server2 712
| 16 Total Processors, 4 Available |
| 64 GB Memory, 32 GB Available |
| Affinity Score (50/95) |

VM201 (Priority 2, Score 50/100)
10 Processors, 16GB Memory

LP202 (Priority 3, Score 50/100)
2 Processors, 16GB Memory

VM101 (Priority 1, Score 90/90)
2 Processors, 4GB Memory

VM403 (Priority 4, Score 70/60)
2 Processors, 4GB Memory

Server3 714
| 32 Total Processors, 8 Available |
| 64 GB Memory, 16 GB Available |
| Affinity Score (90/95) |

VM301 (Priority 1, Score 90/90)
12 Processors, 24GB Memory

VM102 (Priority 1, Score 90/100)
6 Processors, 12GB Memory

Server4 716
| 32 Total Processors, 12 Available |
| 64 GB Memory, 32 GB Available |
| Affinity Score (85/95) |

VM401 (Priority 1, Score 90/100)
16 Processors, 24GB Memory

VM402 (Priority 2, Score 90/90)
1 Processors, 2GB Memory

VM404 (Priority 4, Score 50/100)
1 Processors, 2GB Memory

VM302 (Priority 2, Score 90/100)
12 Processors, 24GB Memory

Server5 718
| 32 Total Processors, 0 Available |
| 128GB Memory, 0 GB Available |
| Affinity Score (90/100) |

VM501 (Priority 1, Score 90/100)
32 Processors, 128GB Memory

FIG. 8

VIRTUAL MACHINE PLACEMENT IN A CLOUD COMPUTING ENVIRONMENT BASED ON FACTORS INCLUDING OPTIMIZED PROCESSOR-MEMORY AFFINITY

BACKGROUND

1. Technical Field

This invention generally relates to cloud computing systems, and more specifically relates to placing virtual machines in a cloud environment based on factors that include optimized processor-memory affinity.

2. Background Art

Cloud computing is a common expression for distributed computing over a network and can also be used with reference to network-based services such as Infrastructure as a Service (IaaS). IaaS is a cloud based service that provides physical processing resources to run virtual machines (VMs) as a guest for different customers. The virtual machine may host a user application or a server.

It is often necessary or desirable to migrate workload in one computer system (a source) to another computer system (a target). Often, workload migration takes the form of migrating one or more virtual machines (sometimes referred to as logical partitions) from the source to the target, the migrated virtual machine's workload previously being performed in the source being subsequently performed in the target. For example, each client of a server may have its own virtual machine within the server for one or more respective client processes, so the workload is migrated by moving the workload of one or more clients, and reconstructing the virtual machine parameters, on one or more other server systems. A virtual machine may be migrated to balance workload among multiple systems, but may also be migrated to perform maintenance on the source system or for some other reason.

Physically, many large server systems are designed as systems having a non-uniform memory access in which multiple processors and main memory are physically distributed, so that each processor has some portion of main memory which is in closer physical proximity (and is accessed faster) than other portions of main memory. In such a system, it is desirable, insofar as possible, to hold instructions and other data required for executing a process or thread in the main memory portion which is physically closest to the processor executing the process or thread, a characteristic referred to as "processor-memory affinity" or "affinity".

BRIEF SUMMARY

An apparatus and method places virtual machines in a cloud environment based on factors where a primary factor is optimized processor-memory affinity. A smart migration mechanism (SMM) predicts an optimization score for multiple permutations of placing virtual machines on a target system to create an optimal move list. The optimization score is a theoretical score calculated using dynamic platform optimization (DPO). The SMM may allow the user to set initial parameters and change the parameters to create potential changes lists. The move lists are ranked to allow the user to select the optimal change list to provide the best affinity, quickest fulfillment of requirements and least disruption for a given set of parameters.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIGS. 7 and 8 illustrate an example of creating an optimal move list for placing virtual machines in a cloud environment based on optimized processor-memory affinity;

DETAILED DESCRIPTION

Figure 1:
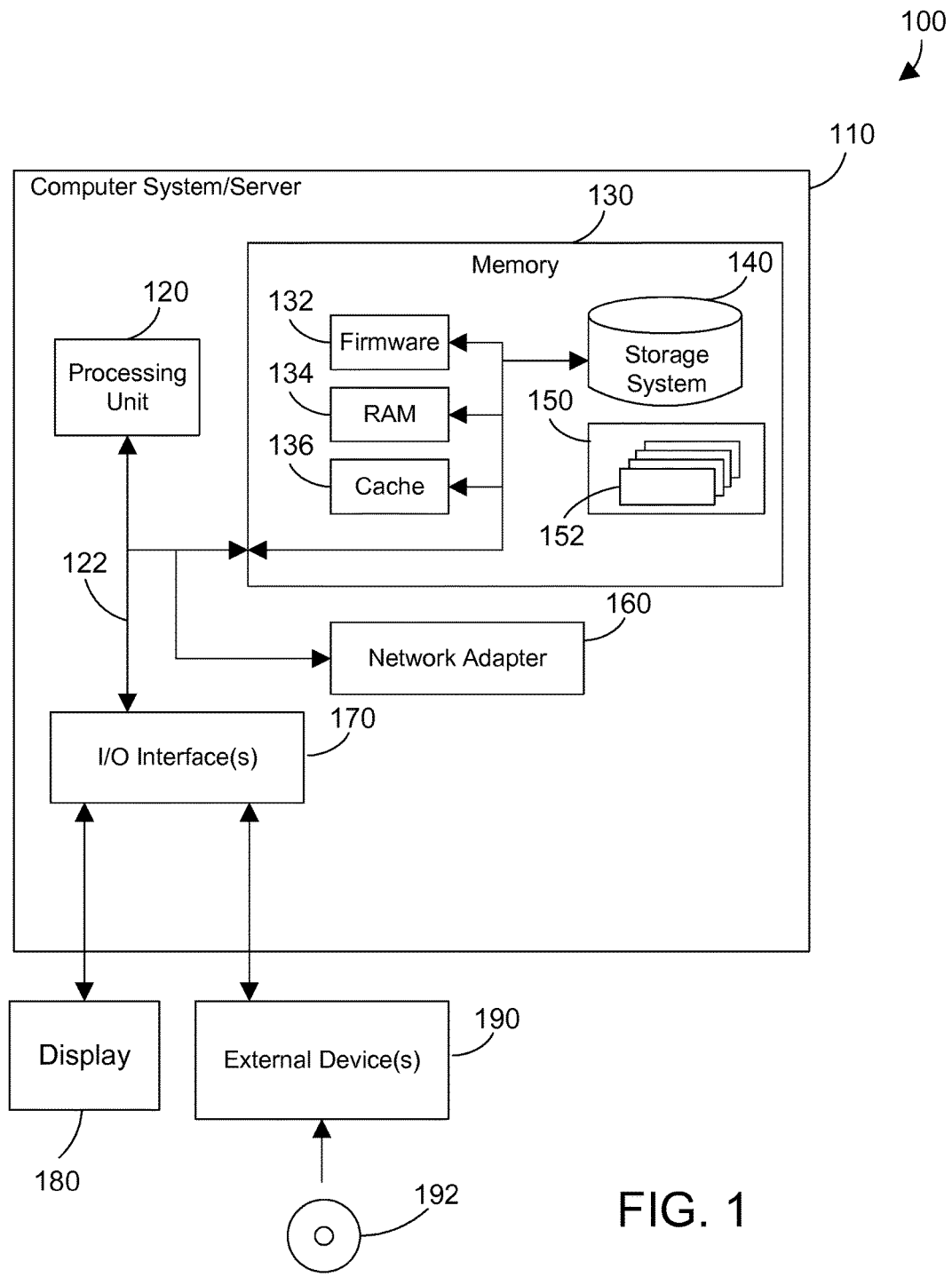
FIG. 1 is a block diagram of a cloud computing node.

The claims and disclosure herein describe placing virtual machines in a cloud environment based on factors where a primary factor is optimized processor-memory affinity. A smart migration mechanism (SMM) predicts an optimization score for multiple permutations of placing virtual machines on a target system to create an optimal move list. The optimization score is a theoretical score calculated using dynamic platform optimization (DPO). The SMM may allow the user to set initial parameters and change the parameters to create potential changes lists. The move lists are ranked to allow the user to select the optimal change list to provide the best affinity, quickest fulfillment of requirements and least disruption for a given set of parameters.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. Examples of removable media are shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. One suitable example of an external device 190 is a DVD drive which can read a DVD 192 as shown in FIG. 1. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
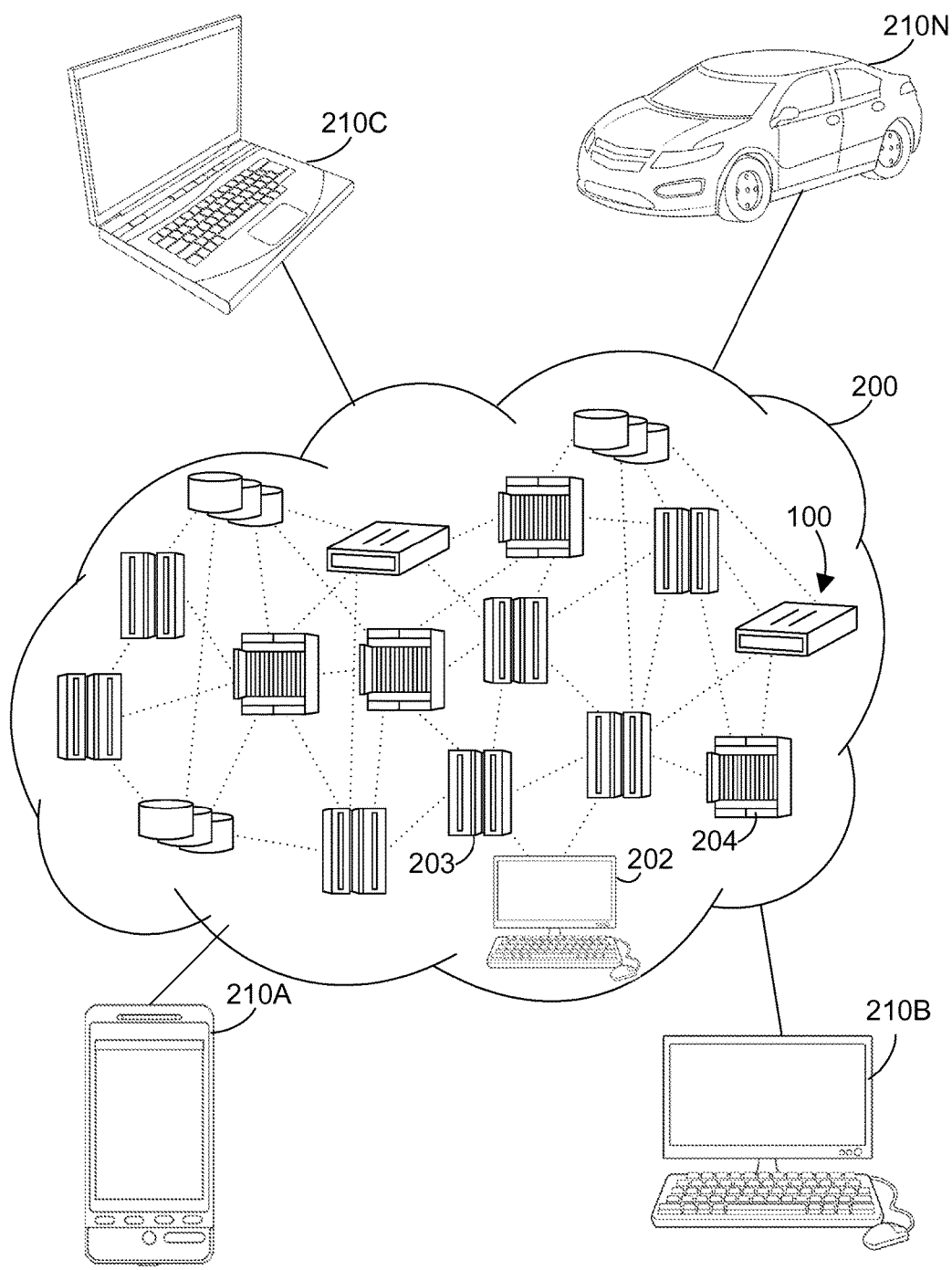
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Again referring to FIG. 2, the cloud computing environment preferably includes a hardware management console 202 to manage the cloud computing nodes 100 including one or more server computer systems 203 (herein generically referred to as feature 203). Hardware management console 202 and server computer systems 203 are preferably general purpose digital computers, each having a respective at least one programmable central processing unit (CPU) which executes instructions storable in an addressable memory such as the computer system/server 110 illustrated in FIG. 1. Digital devices may further include one or more storage servers 204A-204B (herein generically referred to as feature 204) which function as shared data storage available to server computer systems 203. The networked environment may further include additional devices (not shown), such as routers and special purpose digital devices for performing accounting, maintenance, backup, and other functions.

Hardware management console 202 supports an interactive user interface enabling a system administrator or similar user to manage allocations of resources among the various digital data devices, in particular servers 203. In particular, in accordance with one or more embodiments, hardware management console 202 manages the migration of logical partitions or virtual machines from one server 203 to another, as described more fully herein. Hardware management console 202 may further perform other functions of managing a network of servers, such as providing a portal for client requests, assigning client requests to servers and/or logical partitions therein for execution, managing maintenance operations, configuring network connections, and so forth.

Although illustrated as a stand-alone device attached directly to network 201, hardware management console 202 may alternatively be implemented as a software program executing in one of servers 203 (preferably in its own logical partition) to which an interactive terminal is directly attached, or which is accessed by a remote terminal over network 201. The multiple computer system networked environment may include only a single hardware management console 202 as shown in FIG. 2, but may alternatively include multiple hardware management consoles which collectively support the multiple computer systems and share the tasks of managing allocation of resources, etc. Multiple hardware management consoles 202 provide redundancy and continuous operation in the event that any one console malfunctions. In the present Specification, hardware management console 202 will be described as a single computer system apart from the server systems 203, for simplicity and clarity of description, it being understood that the hardware and software components of a hardware management console 202 and their operation described herein may be embodied in and performed by one or more physical server computer systems 203 and software executing thereon.

Figure 3:
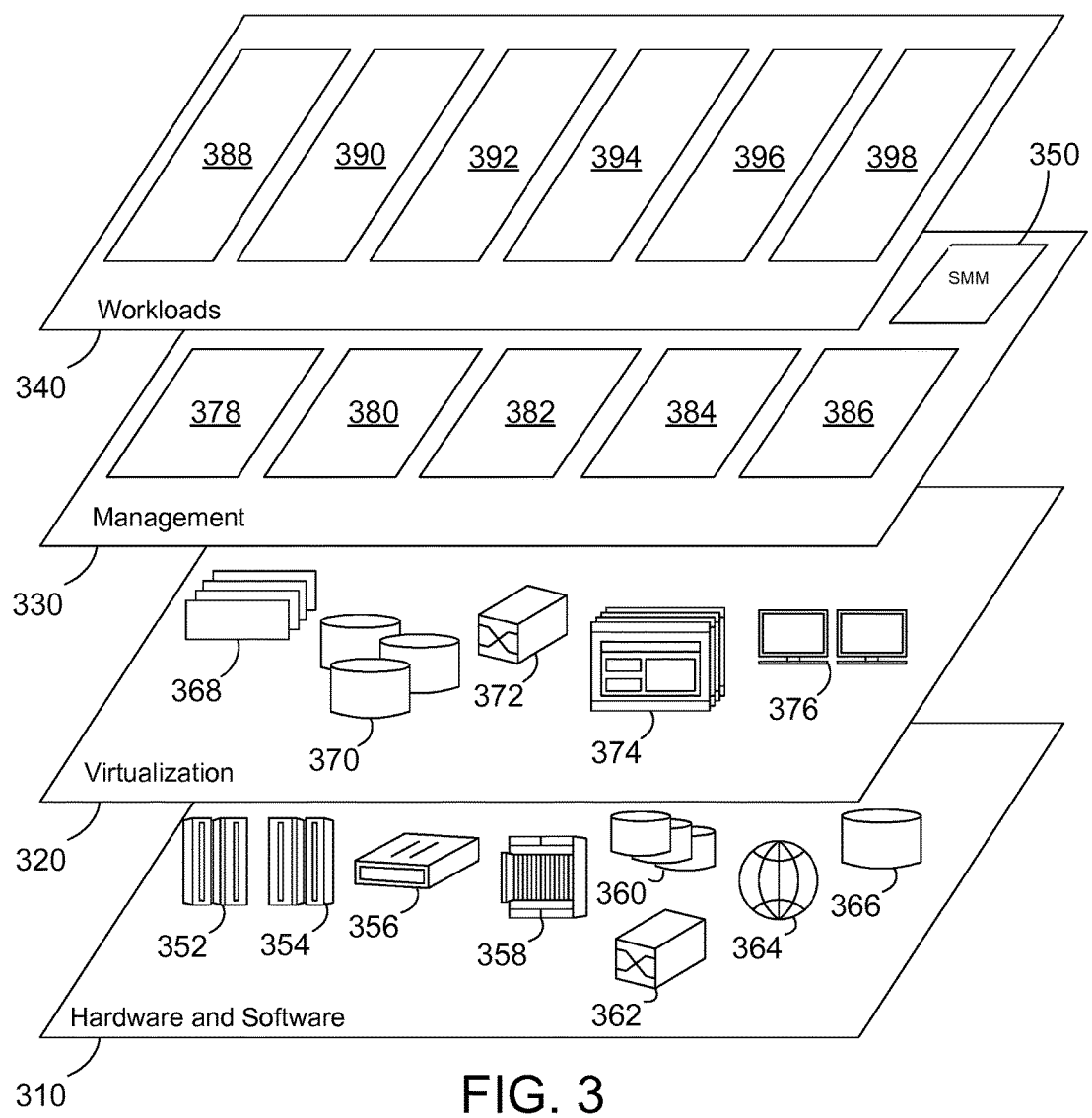
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes a smart migration mechanism (SMM) 350 as described herein. While the SMM 350 is shown in FIG. 3 to reside in the management layer 330, the SMM 350 actually may span other levels shown in FIG. 3 as needed.

Workloads layer 340 provides examples of functionality for which the cloud computing environment may be utilized. Examples of workloads and functions which may be provided from this layer include: mapping and navigation 386; software development and lifecycle management 390; virtual classroom education delivery 392; data analytics processing 394; transaction processing 396 and mobile desktop 398.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

DEFINITIONS

Processor-memory Affinity—generally describes how physically close allocated processors are to associated physical memory to improve performance.

Affinity Scores—a rating for processor-memory affinity for a virtual machine, a system or group of systems.

CiP—Contain in Primary is used with affinity evaluation and scoring where processors and memory fit within a chip. A primary domain is a collection of processors and associated memory locally contained on a physical chip. A primary domain on a chip is the densest physical attribute that affects affinity.

CiS—Contain in Secondary is used with affinity evaluation and scoring where processors and memory cannot fit within a chip, but must be spread across multiple chips, but can fit within a secondary domain.

DPO—Dynamic Platform Optimization attempts to improve virtual machine performance by re-assigning processors and memory among running or powered off virtual machines to improve processor-memory affinity for some or all of them. DPO sometimes refers to a 'DPO operation' if actually re-assigning resources. DPO can also refer to a DPO score. A DPO score is generated by implementing much of the up front DPO function for planned resource moves, but not actually following through with re-assigning anything (the scoring algorithm needs to be aware of what moves are possible just as the DPO moves functionality does).

DPO Score—A DPO value (for example 0 to 100, 0 worst, 100 best) that is determined using algorithms that use a set of rules (CiP, CiS, etc.) governing the allowed physical arrangement of processors and memory on a server or group of servers, the virtual machine requirements for current and max resources, and the possible allocation mappings that can occur given the physical limitations in a server or group of servers. DPO scoring can be done against a current configuration, but also a theoretical potential configuration (to compare before and after effects). A low current score, and a higher theoretical potential score, would be the primary reason to attempt a DPO operation to re-assign resources.

HMC—Hardware Management Console, a HW/SW device that contains a GUI and command line interface used for management of a server or group of servers. The HMC allows a user to perform system or virtual machine power on/off, resource allocations, virtual machine definition, virtual machine migration, DPO, licensing, etc. The SMM function 350 described above may be part of the HMC.

Hypervisor—A low level software layer that executes directly on system processors and manages the dispatching of processors and allocation of memory for the virtual machines (prevents virtual machines from using each others resources inadvertently), among other functions such as I/O management, mobility, and asset protection.

LPM—Live Partition (virtual machine) Mobility, functionality on both source and target systems that offloads a running virtual machine to another host system, with essentially no disruption to the users for the purpose of consolidation, maintenance, or performance improvement etc.

Mobile CoD—Mobile Capacity on Demand, it's a version of licensing that allows the temporary expansion of processor and/or memory resources to a pool of servers, whereas traditional varieties of CoD deal with a single server. This allows for easier movement of virtual machines within a shared pool using LPM in a private cloud environment—customers do not need to get new hardware licenses, and remove licenses etc anymore if using Mobile CoD.

Potential DPO Score—Sometimes called theoretical score, it's calculated on the same numeric scale as a DPO score, but it uses a theoretical rearrangement of processors and memory as input to the scoring algorithm, versus the actual current allocations. This is used to compare with a current score to determine if it's worth the costs of doing a migration and/or DPO to improve performance for a particular virtual machine or system (DPO can have adverse effects too, since it's purpose is to improve performance for high priority virtual machines, it in turn can be detrimental to lower priority virtual machines in addition to the system performance impact during the DPO itself).

SaC—Spread across Cluster, term used with affinity evaluation and scoring if processors and memory cannot fit within a single system, so the virtual machine uses resources on more than one physical system in a pool or cloud at the same time. Individual systems involved in a SaC spread would be using any of the other spread types (such as CiP, etc) within that system.

SaS—Spread across Secondary, as used with affinity evaluation and scoring, where processors and memory cannot fit within one domain, they must be spread across multiple domains.

WiF—Wherever it Fits, in affinity evaluation and scoring where processors and memory cannot be spread evenly across domains (perhaps some drawers don't have memory, etc), then just place it where it will fit and spread as evenly as possible across chips.

Figure 4:
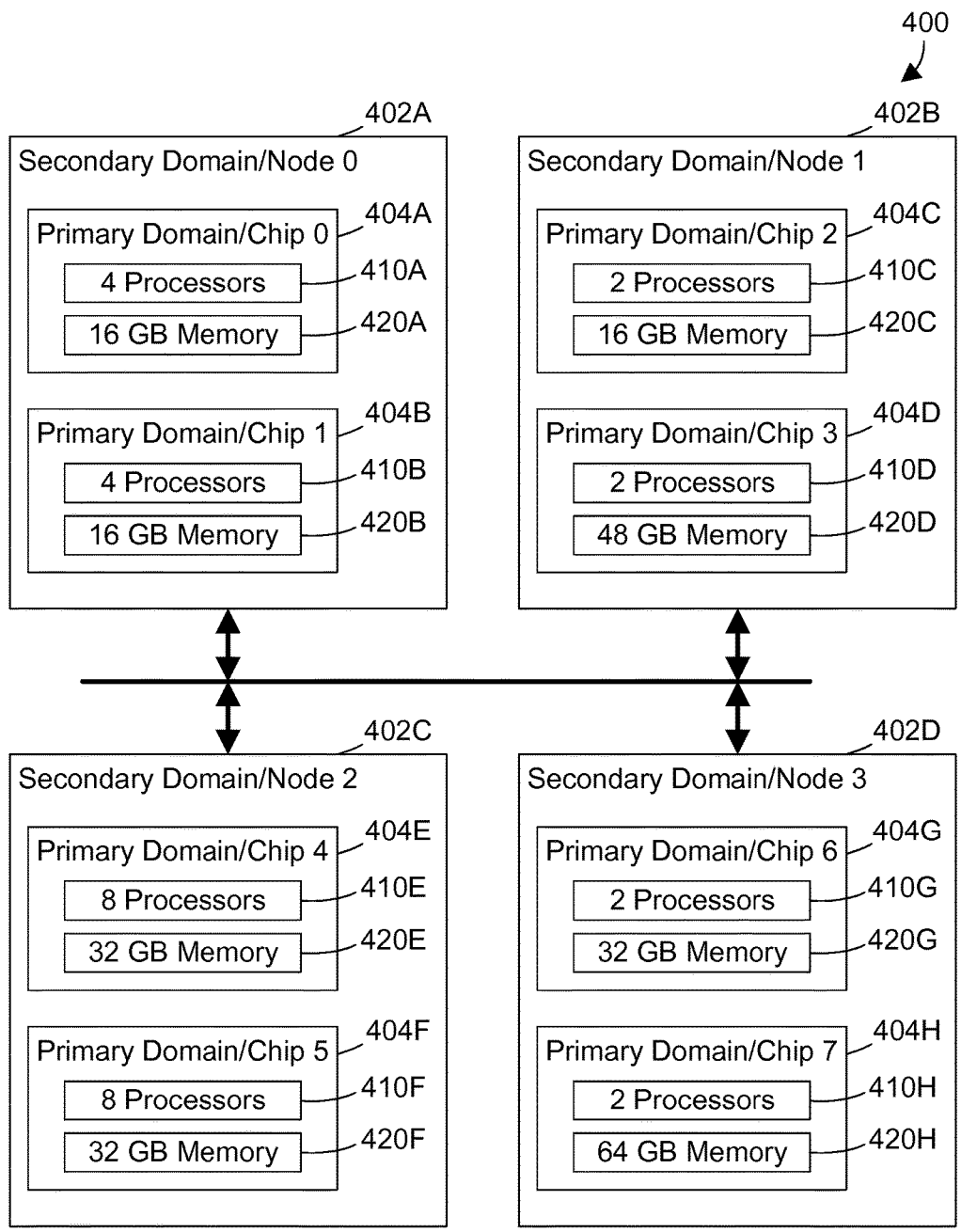
FIG. 4 is a block diagram that illustrates an example a computer system that includes hardware and memory that could be allocated to different virtual machines.

Referring to FIG. 4, a computer system 400 is shown as an example of a computer system that includes hardware and memory that could be allocated to different virtual machines. The hardware is divided into a hardware domain hierarchy according to the physical boundaries of the hardware. We assume for this specific example that primary domains correspond to chips, while secondary domains correspond to nodes or drawers. Note, however, the concepts of primary domains and secondary domains could be applied to any suitable hardware hierarchy, whether currently known or developed in the future. Computer system 400 includes four secondary domains 402A, 402B, 402C and 402D. Each secondary domain includes two primary domains. Thus, secondary domain 402A includes primary domains 404A and 404B; secondary domain 402B includes primary domains 404C and 404D; secondary domain 402C includes primary domains 404E and 404F; and secondary domain 402D includes primary domains 404G and 404H. Each primary domain has physical processors and physical memory. Thus, primary domain 404A includes four processors 410A and 16 gigabytes (GB) of memory 420A; primary domain 404B includes four processors 410B and 16 GB of memory 420B; primary domain 404C includes two processors 410C and 16 GB of memory 420C; primary domain 404D includes two processors 410D and 48 GB of memory 420D; primary domain 404E includes eight processors 410E and 32 GB of memory 420E; primary domain 404F includes eight processors 410F and 32 GB of memory 420F; primary domain 404G includes two processors 410G and 32 GB of memory 420G; and primary domain 404H includes two processors 410H and 64 GB of memory 420H.

Logical Partitioning of Computer System Resources

In the preferred embodiment, each server system 203 is logically partitionable into a plurality of virtual machines each executing on behalf of a respective client or performing administrative or other functions. Partitioning is a technique for dividing a single large computer system into multiple partitions or virtual machines, each of which behaves in some respects as a separate computer system. Computer system resources may be allocated in any of various ways for use by the virtual machines. A given resource may be allocated for exclusive use by a single particular virtual machine, or may be shared among all virtual machines (or some subgroup of virtual machines) on a time interleaved or other basis. Some resources may be allocated to respective particular virtual machines, while others are shared. Examples of resources which may be partitioned are processors (or CPUs), memory, data storage within storage units, and network bandwidth. I/O adapters are typically shared, although they could be partitioned as well. Each client accessing any of servers 203 executes its own tasks in the virtual machine partition assigned to the client, meaning that it can use only the system resources or share of resources assigned to that virtual machine, and not resources assigned to other virtual machines. Additionally, some virtual machines may be used for administrative, maintenance, and other functions, in particular the functions of a hardware management console 202 as described herein.

Virtual machine partitioning of resources is virtual rather than physical. Server computer systems 203 preferably have physical data connections such as buses running among different hardware components, allowing them to communicate with one another. These hardware resources may be shared by and/or allocated to different virtual machines. From a physical configuration standpoint, there is preferably no distinction made with regard to virtual machine partitions. The system's physical devices and subcomponents thereof are preferably physically connected to allow communication without regard to virtual machine partitions, and from this hardware standpoint, there is nothing which prevents a task executing in virtual machine A from writing to memory or storage allocated to virtual machine B.

Generally, allocation of resources to a virtual machine is enforced by a partition manager embodied as low-level encoded executable instructions and data, although there may be a certain amount of hardware support for virtual machine partitioning, such as special hardware registers which hold state information. The partition manager (and associated hardware, if any) prevent access by a virtual machine to the resources allocated to another virtual machine. Code enforcement of partitioning constraints generally means that it is possible to alter the virtual configuration of a partitioned computer system, i.e., to change the number of virtual machines or re-assign resources to different virtual machines, without reconfiguring hardware. In the preferred embodiment described herein, this low-level logical partitioning code is referred to as the "hypervisor".

Figure 5:
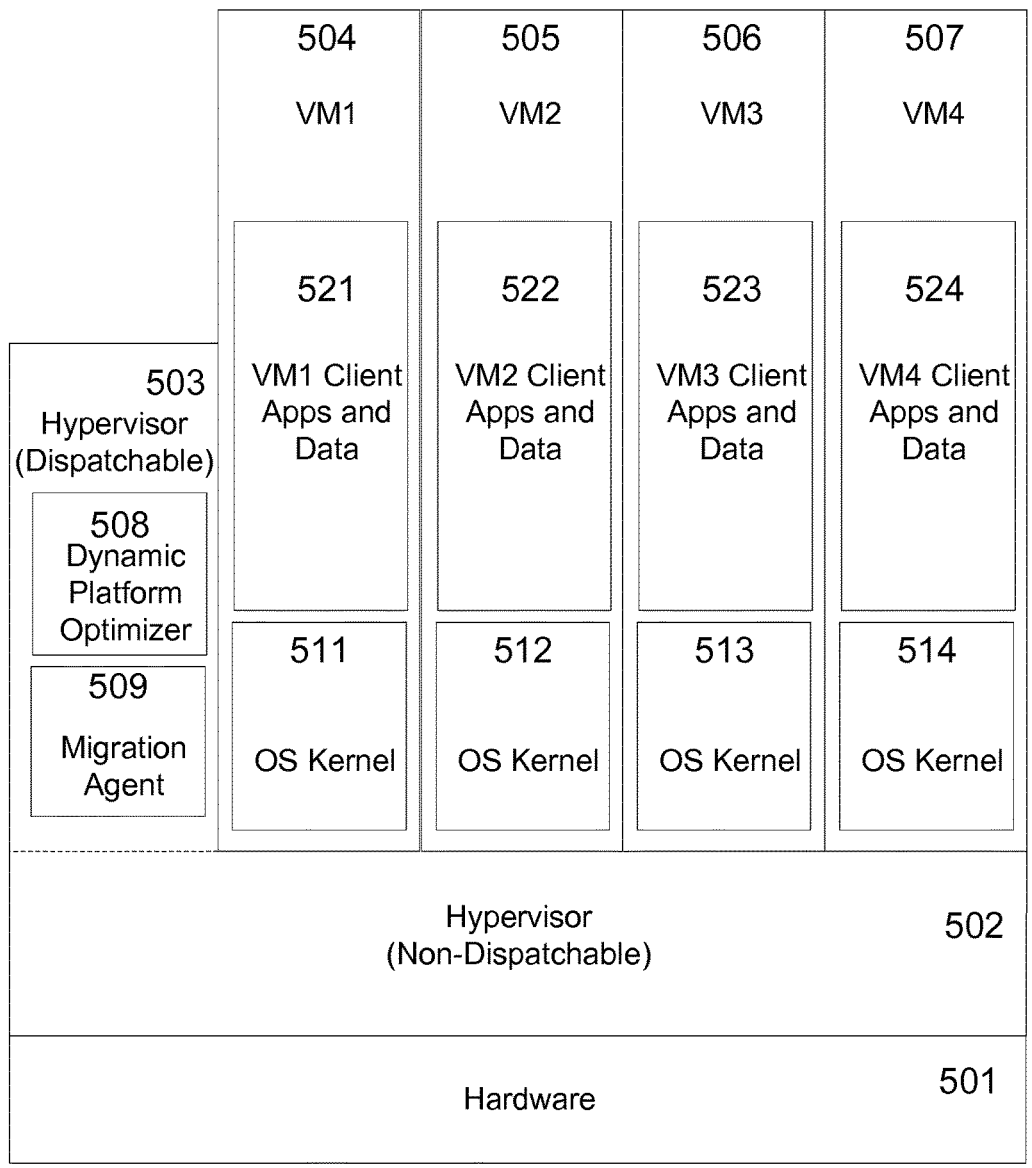
FIG. 5 illustrates manager code and virtual machines in one of the server systems 203 shown in FIG. 2.

FIG. 5 is a conceptual illustration showing the existence of manager code and virtual machine partitions at different hardware and software levels of abstraction in one of server systems 203. FIG. 5 represents a system having four client virtual machines in respective partitions 504-507, each executing one or more applications on behalf of the respective client. These are designated "VM1", "VM2", etc., it being understood that the number of partitions may vary. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through licensed internal code and ultimately to data bits which get put in machine registers to force certain actions. At a very low level, changing electrical potentials cause various transistors to turn on and off. In FIG. 5, the "higher" levels of abstraction are generally represented toward the top of the figure, while lower levels are represented toward the bottom.

As shown in FIG. 5 and explained earlier, logical partitioning of machine resources is a code-enforced concept. In general, at the hardware level 501, partition boundaries do not exist (although there may be certain special purpose registers or other hardware used to identify partition boundaries or other virtual machine aspects). As used herein, hardware level 501 represents the collection of physical devices (as opposed to data stored in devices), such as processors, memory, buses, I/O devices, etc., shown in FIG. 3 and FIG. 4, possibly including other hardware not shown in FIG. 3 or FIG. 4. As far as a processor 402 is concerned, it is merely executing machine level instructions. While code can direct tasks in certain virtual machines to execute on certain processors, there is nothing in the processor itself which dictates this assignment, and in fact the assignment can be changed by the code. Therefore the hardware level is represented in FIG. 5 as a single entity 501, which does not itself distinguish among virtual machines.

Partition boundaries of the virtual machines are enforced by a partition manager (also known as a "hypervisor"), consisting of a non-relocatable, non-dispatchable portion 502, and a relocatable, dispatchable portion 503. The hypervisor is super-privileged executable code which is capable of accessing resources, such as processor resources and memory, assigned to any virtual machine. The hypervisor maintains state data in various special purpose hardware registers, and in tables or other structures in general memory, which govern boundaries and behavior of the virtual machines. Among other things, this state data defines the allocation of resources to virtual machines, and the allocation is altered by changing the state data rather than by physical reconfiguration of hardware.

In the preferred embodiment, the non-dispatchable hypervisor 502 comprises non-relocatable instructions which are executed by any of processors 402 just as instructions for tasks executing in the virtual machines. The code is non-relocatable, meaning that the code which constitutes the non-dispatchable hypervisor is at fixed real addresses in memory. Non-dispatchable hypervisor 502 has access to the entire real memory address range of the computer system, and can manipulate real memory addresses. The dispatchable hypervisor code 503 (as well as all code executing within a virtual machine) is contained at addresses which are relative to an address range assigned to the virtual machine in which it executes, and therefore this code is relocatable. The dispatchable hypervisor behaves in much the same manner as a client's virtual machine, but it is hidden from the clients and not available to execute user applications. In general, non-dispatchable hypervisor 502 handles assignment of tasks to physical processors, memory mapping and virtual machine enforcement, and similar essential tasks required to execute application code in a partitioned system, while dispatchable hypervisor 503 handles maintenance-oriented tasks, such as creating and altering virtual machine definitions.

As represented in FIG. 5, there is no direct path between higher levels (levels above non-dispatchable hypervisor 502) and hardware level 501. While machine instructions of tasks executing at higher levels can execute directly on a processor 402, access to hardware resources is controlled by the non-dispatchable hypervisor. Non-dispatchable hypervisor 502 enforces virtual machine boundaries of processor resources. Task dispatchers at a higher level (the respective operating systems) dispatch tasks to virtual processors defined by the virtual machine parameters, and the hypervisor in turn dispatches virtual processors to physical processors at the hardware level 501 for execution of the underlying task. The hypervisor also enforces partitioning of other resources, such as allocations of memory to partitions, and routing I/O to I/O devices associated with the proper partition.

Dispatchable hypervisor 503 performs many auxiliary system management functions which are not the province of any client virtual machine. The dispatchable hypervisor generally performs higher level virtual machine management operations such as creating and deleting virtual machines, concurrent hardware maintenance, allocating processors, memory and other hardware resources to various virtual machines, etc. In particular, in one or more embodiments dispatchable hypervisor 503 includes a dynamic platform optimizer utility 508 which dynamically analyzes and adjusts system configuration parameters, and a migration agent 509 which handles migration of partitions from one server system 203 to another responsive to commands from the hardware management console, as explained in further detail herein.

Above non-dispatchable hypervisor 502 are a plurality of virtual machines 504-507. Each virtual machine behaves, from the perspective of processes executing within it, as an independent computer system, having its own memory space and other resources, and for this reason is also referred to as a virtual machine. Each virtual machine therefore contains a respective operating system kernel herein identified as the "OS kernel" 511-514. At the level of the OS kernel and above, each virtual machine behaves differently, and therefore FIG. 5 represents the OS Kernel as four different entities 511-514 corresponding to the four different virtual machines. In general, each OS kernel 511-514 performs roughly equivalent functions. However, it is not necessarily true that all OS kernels 511-514 are identical copies of one another, and they could be different versions of architecturally equivalent operating systems, or could even be architecturally different operating systems. OS kernels 511-514 perform a variety of task management functions, such as task dispatching, paging, enforcing data integrity and security among multiple tasks, and so forth.

Above the OS kernels in each respective virtual machine there may be any of various applications and data 521-524. In particular, for server systems 203 supporting virtual machines executing processes on behalf of remote clients 103, these are applications executing on behalf of the respective clients and associated data generated or used by those applications. Additionally, these applications could represent a hardware management console and associated applications and data, as further described herein with respect to FIG. 6. Although applications and data 521-524 have the same appearance in the conceptual representation of FIG. 5, it will be understood that in general each virtual machine includes different applications and data.

Figure 6:
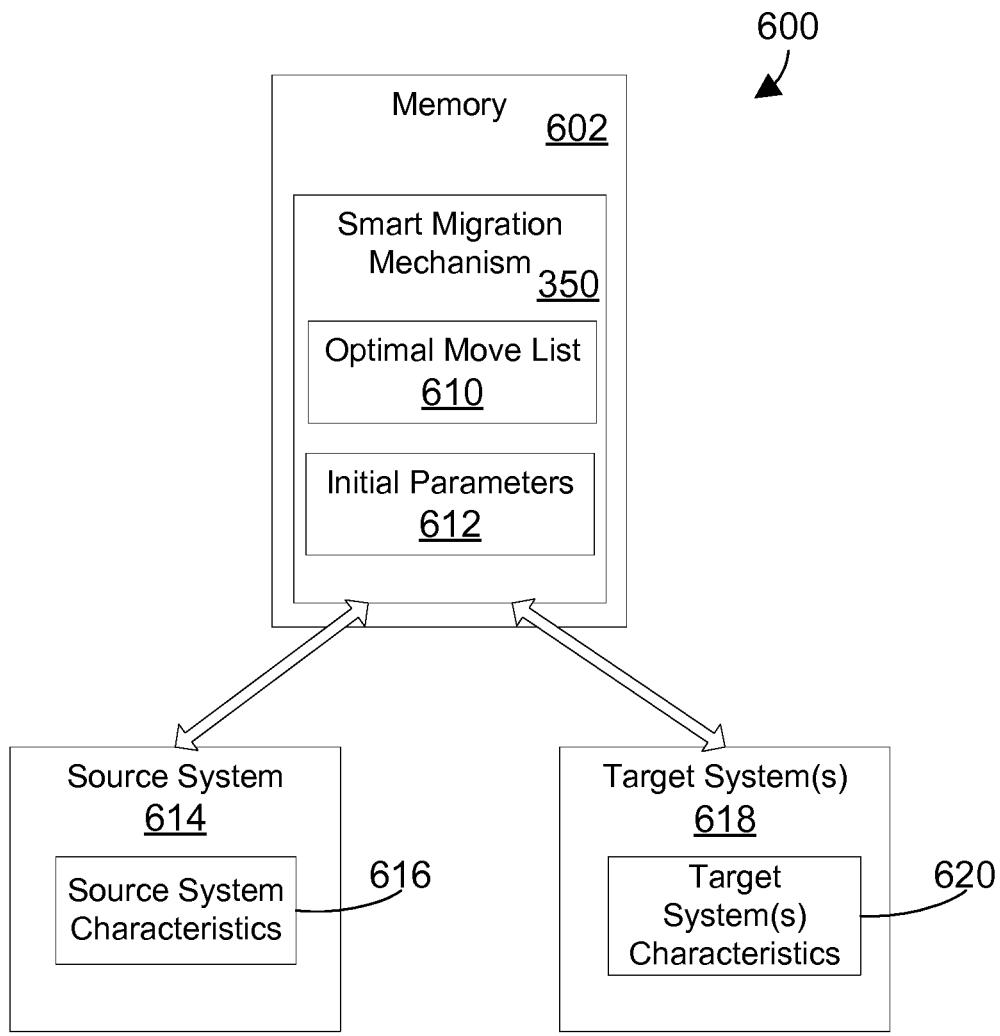
FIG. 6 illustrates a block diagram of a system that places virtual machines in a cloud environment based on optimized processor-memory affinity.

Referring to FIG. 6, a block diagram illustrates a system 600 for placing virtual machines in a cloud environment based on factors such as optimized processor-memory affinity. The smart migration mechanism (SMM) 350 was introduced above with reference to FIG. 3. In this example, the SMM 350 resides in memory 602 which is located in the hardware management console 202 (FIG. 2). The SMM performs move list calculations to allow a user to select an optimal move list 610. To calculate the optimal move list, the SMM first gathers initial parameters 612 from the user. The SMM then gathers data from a source system 614 with source system characteristics 616 and from a target server system(s) 618 with target system(s) characteristics 620. The SMM 350 performs DPO calculations for multiple permutations of moving virtual machines to the target server system(s) 618 to determine the optimal move list 610 as described further below.

Before the SMM 350 creates the move lists to determine the optimal move list 610, the SMM first determines the initial parameters for the list generation. The initial parameters may include the following parameters provided by the user:

1. A list of source and potential target systems in the pool.
2. Logical virtual machine priorities (which are more important, or the same, such as production vs development, or based on function).
3. A minimal processor-memory affinity score, or related performance characteristic, for each virtual machine where final scores should not transition below this score.
4. A goal processor-memory affinity score for each virtual machine that the SMM will try to achieve.
5. Security concerns. For example a production virtual machine may not be allowed to migrate to a development system etc. For each target system there may also be other virtual machines defined that aren't designated by the user (or some automation mechanism) for improvement, so they should also have minimal affinity scores and similar security information that will help prevent them from being negatively affected beyond these defined thresholds.
6. An overall migration time frame limit or date/times to finish may be specified. This defines the maximum time the SMM is allowed to perform the optimization (there may be windows where moves should be discouraged, such as during peak usage times or during maintenance windows when systems are down).

After getting the initial parameters from the user, the SMM 350 communicates with the source and target systems to gather needed information to perform initial checks and create the move lists. This information may include:
1. virtual machine configurations including virtual machine processor counts, virtual machine memory sizes, allocated processor and memory topography (physical processor and memory relationships to each other) for each virtual machine.
2. total processor counts, currently allocated and available, for each system.
3. total memory size, currently allocated and available, for each system.
4. processor and memory hardware topography for each system (a system view vs logical partition view).
5. current system and virtual machine affinity scores, noting where virtual machines rank against the minimum and goal scores previously gathered.

After gathering the above data, the SMM 350 has enough information to perform initial checks and determine if a move list is needed. The SMM may do initial quick checks to see if all goal requirements are already met, or if not, by taking the least disruptive and/or quickest options first that don't involve migrations. For example, if all the criteria are already met, such as when virtual machine affinity scores meet or exceed the goal affinity scores, then the SMM does not need to take further action. Further, the SMM could determine that all criteria could be met by just performing DPO on source systems only and no migrations are needed. Further, if only a few virtual machines need to migrate to achieve the affinity score goals, then the SMM can use simple ordering of virtual machine migrations to target systems and DPO is not needed. In this case, no move list generation is required other than perhaps migrating the highest priority virtual machine first and the rest in order of priority. Typically migration is slower and more disruptive to the virtual machines than DPO. In these simplified cases, all criteria can be met by performing DPO on source and/or target systems, and simple virtual machine migrations to target systems. If all criteria cannot be met using simple migrations and DPO on the source and target systems, then the SMM proceeds to use DPO-score predictions for multiple permutations to determine an optimal move list as described below and then migrates the virtual machines to the target systems per the optimal move list.

Where the SMM 350 determines requirements can not be met using simple migrations and optimization of the source system, the SMM proceeds to create the optimal move list 610 using DPO-score predictions for multiple permutations. To create the optimal move list, the SMM creates multiple move permutations and performs DPO-score predictions of placing virtual machines on the target systems for each of these permutations as described further below. The SMM may then give the user the various lists of the permutations ranked by score. There may be more than one ranked list. The ranking may be by best overall performance, best factoring in the priority, fastest to completion, least disruptive to target systems, etc. The user may be given the opportunity to change initial parameters and the SMM 350 then recreates the ranked lists with the new initial parameters. Where the user is satisfied and does not change the parameters, the user is allowed to approve a move list as the optimal move list for migration of the virtual machines to the target systems.

To score the move list permutations to determine the optimal move list, the SMM performs DPO scoring to predict a score for each of the permutations. For the DPO-score predictions the SMM may assign processor-memory affinity scores as known in the prior art. Typically, the affinity scores used a 0 (worst) to 100 (perfect) scale for logical virtual machines and for systems. The processor-memory affinity score is affected by the processor memory spread, meaning the physical spread between the processor and memory. The types of processor-memory spreads in general go from best case to worst case. In general, it is best to have the processors and memory in use by a virtual machine as physically close as possible. These spread types take into account common hardware boundaries that are typically present in today's computer servers:
 1. Contain in primary (CiP)←Best
 2. Contain in secondary (CiS)
 3. Spread across secondary (SaS)
 4. Wherever it fits (WiF)
 5. Spread across cluster (SaC)←Worst The SMM may consider multiple factors to perform DPO-score predictions for multiple permutations to create the optimal move list 610. Some factors can be given a greater weight than other factors. The various example factors are described herein for discussion into primary factors and secondary factors. In the examples herein, the SMM gives the most weight to the primary factors and lessor weight to the secondary factors.

The primary factors for move list generation may include:
1. DPO score improvements (The difference between current and predicted scores).
2. DPO score degradation (within minimums).

The secondary factors for move list generation may include:
1. DPO operations on processors (throughput degradation during re-assignments).
2. DPO operations on memory (throughput degradation during re-assignments).
3. Migration costs (users experience some slowdown in throughput during live migration).
4. Processor and memory licensing (increased or decreased expense).
5. Processor and memory types. If the processors and memory to be assigned to the migrating virtual machine differ in any significant way that would affect a cost-benefit analysis (speed, efficiency, mirrored vs non-mirrored, etc.), these differences could be weighted as well (double processor speed doubles the impact and so forth).
6. Power usage differences (more or less efficient hardware).
7. List generation processing time itself.

To perform DPO score predictions for the move list permutations, the SMM may first take into account eliminating the wasted process of scheduling moves to systems that will cause a violation of the requirements for some virtual machines. To do this, a 'no-move' list may be generated at this point and referred to at various times during the process. This no-move list could account for virtual machines that can't share the same server. For example, a high value production virtual machine and a development virtual machine, to lessen the chance of system failures affecting the high value virtual machine, etc. The no-move list would be referred to each time a potential target system is examined for a virtual machine to move to.

To perform DPO score predictions for the move list permutations, the SMM may account for processor and memory licensing availability and additional costs or savings by adding or removing resource usage in each system in the pool. Mobile capacity on demand (CoD) is a function that helps with temporary transition of licenses across systems for migration ease, so that can be taken into consideration. The SMM needs to know the licensing landscape so first of all to not exceed any licenses but also to determine if there are cost-benefit differences between servers.

The SMM 350 performs DPO-score predictions for the move lists on target systems. If virtual machines have the same priority, the SMM may run DPO-score predictions on each possible ordering of moving the virtual machines since doing DPO in a particular order affects the overall ability to DPO scoring and the overall scores. In other words if two virtual machines have different configurations, but have the same priority, doing a DPO for one virtual machine before doing DPO for the other one affects the resulting system affinity/config layout in one way, but performing them in reverse order will result in a different resulting affinity/layout. So the order in which migrating the pardons is done is important for the optimal move list.

The SMM must make a determination of how many permutations to create and consider for move lists. The number and type of permutations run can vary based on user input and/or configuration factors. For example, for small numbers of virtual machines, perhaps it's appropriate to examine all possible variations and create all possible move order lists. If compute time is a factor, due to the number of permutations, then limits such as always moving the virtual machines in priority order, but the list varies by which targets are chosen (in other words each list in this case always has the same move order, but they vary by which target system is affected for each virtual machine).

The SMM 350 may account for virtual machines that are sufficiently similarly configured with like requirements and skip a number of permutation computations if there would be no significant difference in the resulting scores. In other words, in order to cut down on the number of permutation calculations the SMM should determine which virtual machines have similar characteristics and if there are any matching ones, then just run one set of permutations (if virtual machine A is similar enough to virtual machine C, then there is no need to run permutations A, B, C and C, B, A).

Figure 7:

FIGS. 7 and 8 described in the following paragraphs illustrate an example of creating an optimal move list for placing virtual machines in a cloud environment based on optimized processor-memory affinity. In this example a cloud environment exists with eleven virtual machines spread across five servers. Five of the virtual machines have unacceptable performance characteristics primarily due to poor processor-memory affinity (in this example) and are good candidates to determine if a local DPO operation will provide enough improvement—but failing that, the focus of this invention, computation is done to determine if migrations to target systems, and possibly further DPO operations on source and target systems, allow the performance targets to be met. If so, as part of these calculations, migration move order lists are generated with specific targets and possible DPO operations and projected improvements are presented so that the user is assured the best possible performance outcome when confronted with a complicated cloud environment.

For simplicity, the example in FIGS. 7 and 8 primarily focuses on the current and projected processor-memory affinity scores for each migrated, and DPO-affected non-migrated, virtual machine as well as total system scores.

Also all systems are assumed to be allowed as targets. Other variables could be taken into account as primary or secondary factors when calculating and performing processor-memory improvement operations. These variables could include: servers in the cloud that contain virtual machines, currently allocated processor counts for each server, currently allocated memory sizes for each server, maximum processor licensing for each server and per unit cost, maximum memory licensing for each server and per unit cost, processor performance and power characteristics for each server, memory performance and power characteristics for each server, virtual machines on the servers that need performance improvement, virtual machines on the servers that have acceptable performance, minimum and current numbers of processors required by each virtual machine, minimum and current memory sizes required by each virtual machine, minimum processor-memory affinity scores for each virtual machine and server, known virtual machine priority values, virtual machine security requirements, maximum migration move list calculation time (if any), and maximum migration process and DPO process time (if any).

FIG. 7 illustrates the initial state of five servers for this example. Each server 710, 712, 714, 716, and 718 has the processor, memory and affinity scores as shown. The affinity score 720 of Server1 710 is shown as (90/70). These numbers represent the minimum/current affinity scores for Server1 710. The other servers have similar affinity scores. The servers also have one or more virtual machines as shown. For example, Server1 710 has a virtual machine VM101 722. In this example, the first number in the virtual machine number (i.e. the first "1" in "101) of the virtual machine name represents that the server originated in Server1 710. The initial conditions of the servers 710, 712, 714, 716, 718 can be summarized as follows. For Server1 710 the system affinity score is below its minimum goal score of 90, the server has some processors and memory available for immediate use for possible local DPO operations or for migration target use and both VM101 and VM102 are below their affinity goal scores. For Server2 712, the server affinity score is a perfect 100, with 'room' to regress and still meet the minimum goal score of 50. The server has some processors and memory available for immediate use for possible local DPO operations or for migration target use. The virtual machine scores are also perfect as expected if system score is perfect, with minimum goal scores well below the max. For Server3 714, the server affinity score 70 is below its minimum goal score of 90. The system has some processors and memory available for immediate use for possible local DPO operations or for migration target use, and is below its affinity goal score. For Server4 716 the server affinity score 90 is just above the minimum goal score of 85, the system has some processors and memory available for immediate use for possible local DPO operations or for migration target use and is below its affinity goal score. For Server5 718, the server affinity score is a perfect 100 and the system does not have any available processors or memory for DPO or target migration.

The first step for the example shown in FIGS. 7 and 8 is to determine the initial parameters and inputs. The initial inputs required by the SMM in this example include:

1. The source systems S1, S2, S3, S4, and S5 where the 'S' signifies source and the number refers to the server number 1 through 5 710, 712, 714, 716, 718.
2. The target systems T1, T2, T3, T4, and T5 ('T' signifies target, in this example all systems can be a source and/or target so S1 and T1 are the same system).

3. Logical machine rankings, with VM101, VM102, VM301, VM401 and VM501 given the highest priority.
4. Minimal affinity scores for virtual machines.
5. Minimal affinity scores for servers are also given, this can be an important factor if one server is more expensive to purchase and maintain compared to another, and as such it makes sense to utilize it to more efficiently by specifying a higher minimal affinity score.
6. Goal affinity scores for virtual machines.
7. Goal affinity scores for servers are also given.
8. In this example security concerns are not specified for simplicity.
9. In this example maximum migration and processing times are not specified for simplicity.

After determining initial parameters, the SMM gathers source system information. The source system and virtual machine hardware configurations and topology are known. Source systems S1 through S5 have virtual machines VM101, VM102, VM302, and VM403 that have current scores below the minimum and are candidates for DPO and migration to improve the scores. VM101 and VM102 have the highest priority. VM302 is next in priority, and VM403 has the lowest priority.

After gathering source system information, the SMM gathers target system information. Target system configurations and topology are known. In this example all systems can be used as potential targets. Virtual machines whose affinity score is acceptable may still be affected by DPO operations on their host server, however the SMM should guard against the scores dropping below the minimum score unless it is to enable a score increase to a higher priority virtual machine with enough overall gain to compensate (for example if the system score increases as a result of lower priority decrease and higher priority increase). For example, the smart migration mechanism may migrate a virtual machine to a system that causes a lower priority virtual machine to drop below a minimum score but the migration also causes the higher priority virtual machine a significant increase in score such that the migration results in an overall increase in system performance.

After gathering source and target system information, the SMM performs initial checks. Some virtual machines and systems have affinity scores below their goal target, but for this example it is determined that simple local DPO will not provide enough improvement and that there are enough virtual machines affected that list generation is required. The SMM then determines if a move list is needed. Some virtual machines and systems require affinity improvement and initial checks determined that local DPO and simple migration is not sufficient so proceed to the generation of move lists. In this example, we determine a move list is needed because doing just local DPO will not be sufficient to meet the VM requirements. Thus no local DPO operations will be done or obvious migrations (pre-list generation improvements). In other examples, pre-processing may be done as initial quick checks determine some obvious simple improvements, and then new source and target configuration information will be gathered before proceeding to list generation.

After determining a move list is needed, the SMM generates and ranks an optimal move list according to the following steps. First, the SMM creates migration permutations. In this example, there are five source systems and five target systems, with four virtual machines that need affinity score improvement. Move list generation first requires the calculation of the maximum number of permutations given the number of target systems and the number of virtual machines to migrate. In this example, even though there are only four virtual machines to migrate, there are many theoretical permutations. However many can be eliminated immediately, since they are not possible (not enough resources available on the target, security restrictions, etc.). Also a virtual machine cannot migrate to its source server obviously, although in some implementations it may make sense to migrate to a different target, then eventually migrate back to the original source system after other changes have taken affect. For example, a complicated situation where a virtual machine is temporarily migrated off a source system, along with possibly other 'permanent' migrations off the source system, then DPO operations are performed on the source system that was not possible before (more resources freed up to move), then it may arise that the temporarily migrated virtual machine is migrated back to the original source system. It then has the best possible affinity score that was only made possible by 'shuffling' it and other virtual machines around in the cloud. This type of multiple target move scenario is not discussed in detail in this disclosure however it is a natural progression of the concept of creating move lists to single target servers.

For move list permutations, there are 1*2*3*4=24 combinations of ordering of the four virtual machines of this example. The 24 combinations are as follows, where "Tx" means a target system as discussed further below.
1) VM101, VM102, VM302, VM403→Tx
2) VM101, VM302, VM403, VM102→Tx
3) VM101, VM403, VM102, VM302→Tx
4) VM101, VM102, VM403, VM302→Tx
5) VM101, VM302, VM102, VM403→Tx
6) VM101, VM403, VM302, VM102→Tx
7) VM102, VM101, VM302, VM403→Tx
8) VM102, VM302, VM403, VM101→Tx
9) VM102, VM403, VM101, VM302→Tx
10) VM102, VM101, VM403, VM302→Tx
11) VM102, VM302, VM101, VM403→Tx
12) VM102, VM403, VM302, VM101→Tx
13) VM302, VM102, VM101, VM403→Tx
14) VM302, VM101, VM403, VM102→Tx
15) VM302, VM403, VM102, VM101→Tx
16) VM302, VM102, VM403, VM101→Tx
17) VM302, VM101, VM102, VM403→Tx
18) VM302, VM403, VM101, VM102→Tx
19) VM403, VM102, VM302, VM101→Tx
20) VM403, VM302, VM101, VM102→Tx
21) VM403, VM101, VM102, VM302→Tx
22) VM403, VM102, VM101, VM302→Tx
23) VM403, VM302, VM102, VM101→Tx
24) VM403, VM101, VM302, VM102→Tx Referring to the permutations of the previous paragraph, since there are five target systems, there are 24*5=120 simple migrations with all VMs going to the same target server. However all combination of target systems need to be considered. Since target locations can repeat, in this example for instance the four virtual machines might all go to T1 assuming they would fit. Thus, for five target systems the number of combinations of "Tx" in the above permutation list is: 5*5*5*5=3125. The theoretical maximum move list combinations are then 24*3125=75000. However, this is before accounting for a number of factors that should limit this very large number to something manageable. The first factor is impossible migrations. In this example, T5 has no resources to spare, and furthermore its sole virtual machine has perfect affinity so there is no incentive to alter the configuration or reason to migrate off the system (to make room for a different virtual machine needing improvement). In some instances, it might make sense to actually migrate this virtual machine if it can still achieve the same perfect affinity but overall help improve the affinity score of the cloud. The second factor is duplicate virtual machine to target ordering. In this example a theoretical maximum combination count of 75000 was calculated, but in a very simple example of duplicates virtual machines VMA, VMB migrating to→target systems T1, T2 is the same (in the end) as VMB, VMA→T2, T1. The virtual machines are going to the same targets even if migrated in different order. However there may be factors that affect whether or not these 'duplicates' should be eliminated, because each migration and DPO operation can have an effect on future migrations and DPO operations, so in more complicated scenarios even though the same virtual machine migrate to the same target systems, because of ordering differences it may affect the ability to DPO effectively or not on target systems if done in a different migration order. The third factor to limit the large number of permutations is configuration duplicates. Similarly configured virtual machines and systems may be treated as duplicates. There might be insignificant differences such that these calculations can be eliminated.

The SMM generates the permutations as discussed above. There are a number of valid migration lists in this scenario. For brevity in this simplified example we will consider the following two lists generated by the SMM as described above:

List 1
1. VM101→T2
2. VM102→T3
3. VM302→T4
4. VM403→T2

List 2
1. VM101→T2
2. VM102→T3
3. VM403→T2
4. VM302→T4

The difference between the two lists for the simple example above is the order between VM302 and VM403 migrations. VM302 is the largest virtual machine, and by migrating VM403 first off of server 4 (which, in this list, is the target for VM302), it makes more room for VM302 to get favorable affinity with or without DPO operations on T4. In general, the more free resources relative to the size of the virtual machine being moved, the greater the possibility of achieving the affinity goal for VM403 (all other virtual machine scores should be the same). Another related alternative list would have the orders of VM101 and VM302 swapped, since moving virtual machines to and virtual machines from a particular server can affect the DPO score of other virtual machines that are migrated to that server (so swapping VM101 and VM302 migration order may have an impact on the DPO scores on target server 2).

The SMM 350 then calculates target system DPO score predictions for each of move lists. For list 1 and list 2 potential affinity scores are calculated for the virtual machines and the servers (if desired). In this simplified example where the comparison is between only two lists, list 2 has a potential for greater improvement. So, for example, potential scores are calculated as follows:

| VM | Minimum | Current | Potential |
|---|---|---|---|
| List 1 | | | |
| VM101 | 90 | 50 | 90 |
| VM102 | 90 | 80 | 100 |
| VM302 | 90 | 50 | 75 |
| VM403 | 70 | 50 | 60 |
| List 2 | | | |
| VM101 | 90 | 50 | 90 |
| VM102 | 90 | 80 | 100 |
| VM403 | 70 | 50 | 60 |
| VM302 | 90 | 50 | 100 |

VM302 not only should achieve its goal with the second list, it should exceed it. Note that VM403 did not achieve its goal with either list, however it's still an improvement, shown here to demonstrate that it might not be possible to always achieve the affinity goal. Further, server 4 system affinity score should be higher than in the current state, possibly for list 1 (depending on if the removal of VM403 and the addition of VM302 produces a better system score), but certainly for list 2 since in that case an under-performing virtual machine was exchanged with a virtual machine with an above goal score.

After calculating target system DPO score predictions, the SMM produces ranked migration lists. In the above example lists, list 2 is ranked above list 1 based on a couple of simplified factors. All else being equal, VM302 affinity score is better with list 2 than with list 1, and server 4's affinity score should be higher with list 2 than with list 1.

After determining ranked lists, the SMM 350 may allow a user or system administrator to change the initial parameters as described above. The administrator may wish to alter parameters such as virtual machine priorities, affinity goals, available target systems etc. The SMM may allow the user to do these things before proceeding with the migrations. If anything changed, then the number and nature of the permutations may need to be changed, or perhaps the list rankings or server scores need to be altered. If for example, virtual machine priorities are changed, then that would affect server affinity scores and list rankings. The administrator may have the option to choose among lists depending on which factors are important. The administrator may just consider the best affinity scores for the highest ranked virtual machines, or perhaps the best affinity scores of the servers in the cloud, or perhaps some balance between score improvement and less disruption etc. The administrator (or automation) then selects the best list to proceed. The list would denote the order of the migrations of course, but also may indicate at which step DPO operations are to be performed (on source and/or target systems before or after virtual machine X moves from and to server Y, etc). The SMM 350 then starts migrations and any DPO operations. In this example, we assume the administrator chooses to migrate virtual machines according to list 2. After the migrations, the virtual machines appear as shown in FIG. 8 with the improved affinity scores as shown. The SMM 350 may monitor the migration and DPO operations to ensure the processing does not exceed a pre-selected maximum time. The SMM 350 and DPO 508 may keep track of actual vs predicted affinity scores to present to the administrator as the process continues to completion.

Figure 9:
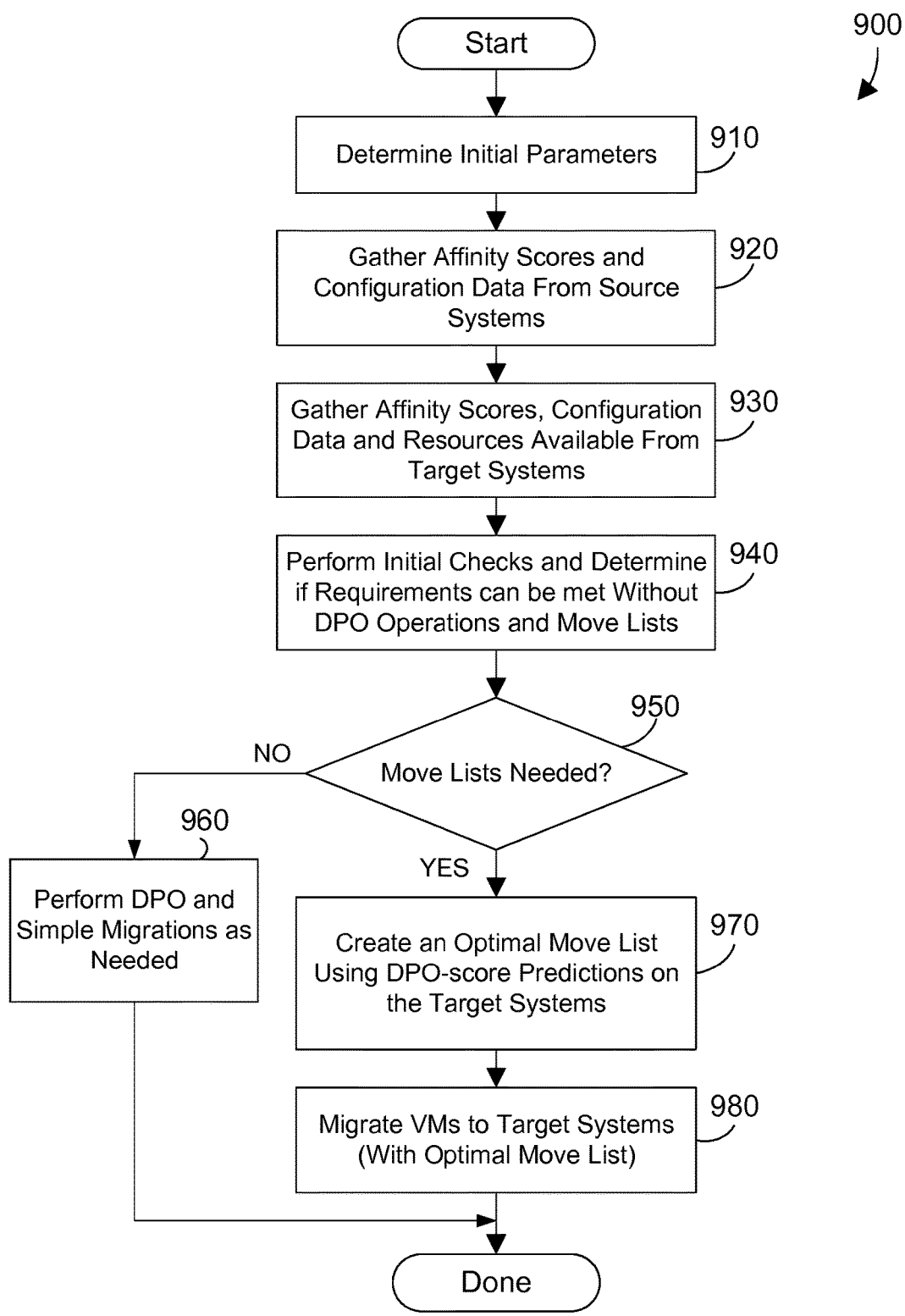
FIG. 9 is a flow diagram for placing virtual machines in a cloud environment based on optimized processor-memory affinity.

FIG. 9 illustrates a flow diagram of a method 900 for placing virtual machines in a cloud environment based on optimized processor-memory affinity. The method 900 is presented as a series of steps performed by a computer software program such as the smart migration mechanism 350 described above. First, determine initial parameters (step 910). Gather affinity scores and configuration data from source systems (step 920). Gather affinity scores, configuration data and resources available from target systems (step 930). Perform initial checks and determine if requirements can be met without DPO operations and move lists (step 940). If move lists are not needed (step 950=no) then perform DPO and simple migrations as needed (step 960) and the method is then done. If move lists are needed (step 950=yes) then create an optimal move list using DPO-score predictions on the target systems (step 970). Migrate virtual machines from the source system to the target systems using the optimal move list (step 980). The method is then done.

Figure 10:
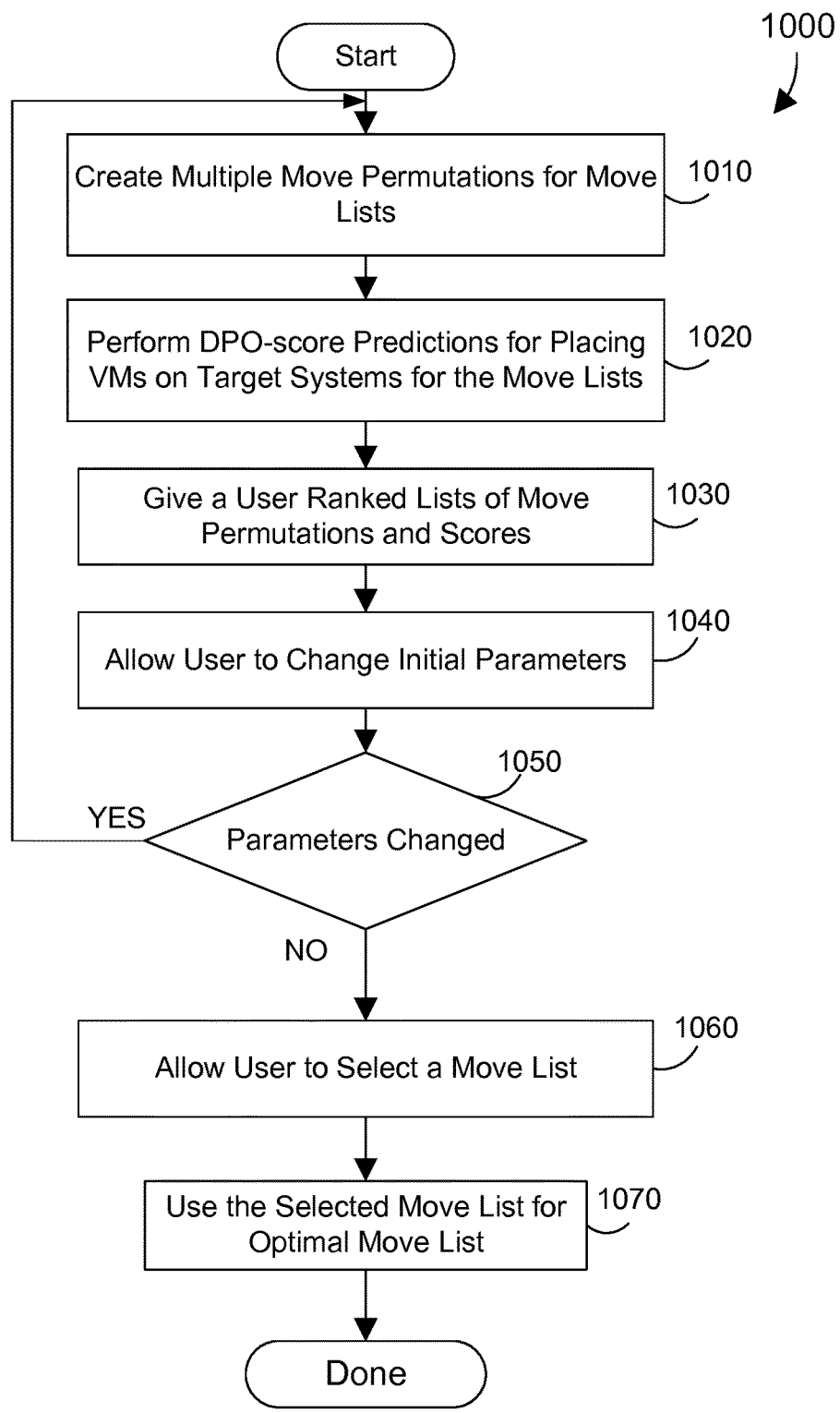
FIG. 10 is a flow diagram of an example method for step 870 in FIG. 8.

Referring now to FIG. 10, a flow diagram shows method 1000 that is an exemplary method for performing step 970 in method 900. The method 1000 is presented as a series of steps performed by a computer software program described above as the application smart migration mechanism 350. First, create multiple move permutation for move lists (step 1010). Perform DPO-score predictions of placing virtual machines on the target systems for each list (step 1020). Give the user ranked lists of move permutations and scores (step 1030). Allow the user to change the initial parameters (step 1040). If the parameters are changed (step 1050=yes) then go to step 1010. If the parameters are not changed (step 1050=no) then allow the user to select a move list (step 1060). Use the selected move list for the optimal move list (step 1070). The method is then done.

Figure 11:
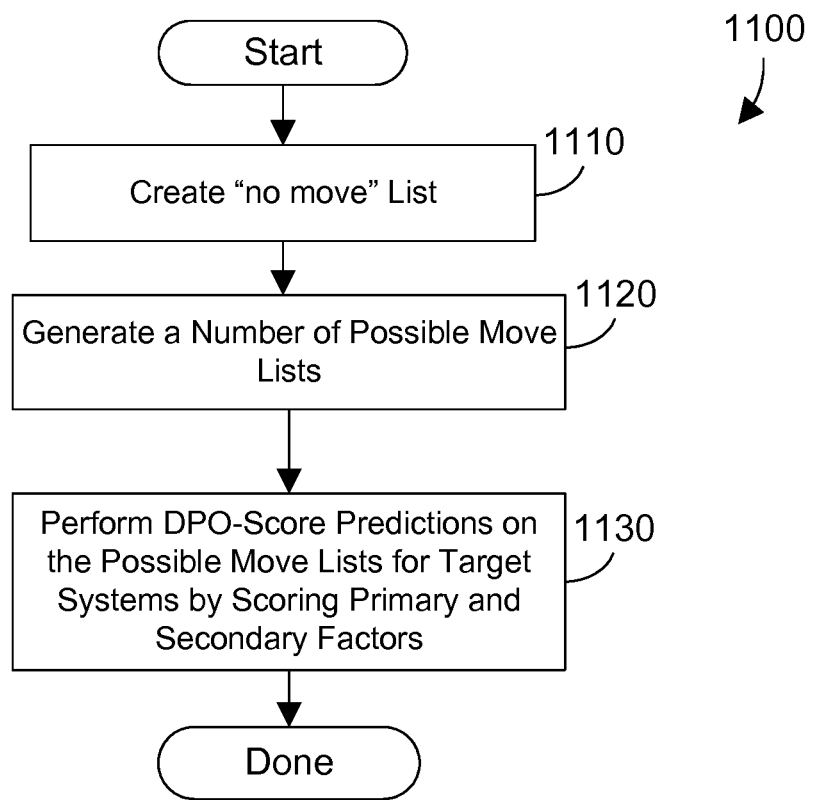
FIG. 11 is a flow diagram of an example method for step 1020 in FIG. 10.

Referring now to FIG. 11, a flow diagram shows method 1100 that is an exemplary method for performing step 1020 in method 1000. The method 1100 is presented as a series of steps performed by a computer software program described above as the application smart migration mechanism 350. First, create a no-move list (step 1110). Generate a number of possible move lists (step 1120). Perform DPO-score predictions on the move lists for the target systems by scoring primary and secondary factors (step 1130). The method is then done.

The claims and disclosure herein provide an apparatus and method for placing virtual machines in a cloud environment based on optimized processor-memory affinity. A smart migration mechanism (SMM) predicts an optimization score for multiple permutations of placing virtual machines on a target system to create an optimal move list to allow the user to select an optimal move list to migrate the virtual machines from the source system to enhance the performance of the overall systems.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for migrating a virtual machine from a source system to a target system, the method comprising:
generating multiple move lists wherein each move list comprises one permutation of an ordered list for placing the plurality of virtual machines on the target system;
predicting an optimization score for each of the multiple move lists to determine an optimal move list having the best optimization score and using the optimal move list to move the at least one virtual machine of the plurality of virtual machines from the source system to the target system;
wherein the optimization score is a theoretical score calculated using dynamic platform optimization;
scoring the multiple move lists with primary and secondary factors, wherein the primary factors include processor memory affinity of the virtual machines placed on the target systems; and
ranking the multiple move lists and providing a user with a plurality of ranked move lists with scores for each of the ranked move lists.

2. The method of claim 1 further comprising predicting the optimization score using dynamic platform optimization.

3. The method of claim 1 wherein the optimization score is determined with primary and secondary factors, wherein the primary factors include processor memory affinity of the virtual machines placed on the target systems.

4. The method of claim 1 further comprising creating a no-move list that is referenced when scoring the multiple move lists to create the optimal move list.

5. The method of claim 1 further comprising giving a user a plurality of ranked move lists with scores for the ranked move lists and allows the user to select a move list from the plurality of ranked move lists to use as the optimal move list.

6. The method of claim 1 further comprising ranking the multiple move lists and providing a user with a plurality of ranked move lists with scores for each of the ranked move lists, and allowing the user to change initial parameters, and when the user changes parameters, repeating the step of predicting an optimization score for the multiple move lists.

7. The method of claim 1 further comprising determining no move lists are needed and performing simple virtual machine migrations.

8. The method of claim 1 further comprising migrating virtual machines to target systems according to the optimal move list.

9. The method of claim 1 further comprising migrating a virtual machine to a system that causes a lower priority virtual machine to drop below a minimum score but the migration also causes a higher priority virtual machine a significant increase in score that results in an overall increase in system performance.

10. A computer-implemented method executed by at least one processor for migrating a virtual machine from a source system to a target system, the method comprising:
determining initial parameters for a plurality of virtual machines on a plurality of source and target systems;
gathering affinity scores and configuration data from the sources systems and from the target systems; and
generating multiple move lists wherein each move list comprises one permutation of an ordered list for placing the plurality of virtual machines on the target systems;
predicting an optimization score for each of the move lists using dynamic platform optimization to determine a plurality of ranked move lists with scores for the ranked move lists, wherein the optimization score is determined with primary and secondary factors, wherein the primary factors include processor memory affinity of the virtual machines placed on the target systems;
giving a user the plurality of ranked move lists and allowing the user to select a move list from the plurality of ranked move lists to use as the optimal move list; and migrating the at least one virtual machine of the plurality of virtual machines from the source system to the target system according to the optimal move list selected by the user.

11. The method of claim 10 further comprising allowing the user to change initial parameters, and when the user changes initial parameters, repeating the step of predicting an optimization score for the multiple move lists.

\* \* \* \* \*